US008675951B2

(12) United States Patent
van den Hengel et al.

(10) Patent No.: US 8,675,951 B2
(45) Date of Patent: Mar. 18, 2014

(54) METHOD AND SYSTEM FOR GENERATING A 3D MODEL

(75) Inventors: Anton John van den Hengel, Trinity Gardens (AU); Anthony Robert Dick, Maylands (AU); Thorsten Thormaehlen, Saanbruecken (DE); Benjamin William Stephen Ward, Adelaide (AU); Philip Hilaire Sean Torr, Wheatley (GB)

(73) Assignee: Three Pixels Wide Pty Ltd., Trinity Gardens, South Australia (AU)

( * ) Notice: Subject to any disclaimer, the term of this patent is extended or adjusted under 35 U.S.C. 154(b) by 1212 days.

(21) Appl. No.: 12/117,336

(22) Filed: May 8, 2008

(65) Prior Publication Data

US 2009/0009513 A1      Jan. 8, 2009

Related U.S. Application Data

(60) Provisional application No. 60/917,361, filed on May 11, 2007.

(51) Int. Cl.
*G06K 9/00* (2006.01)
*G06T 17/00* (2006.01)

(52) U.S. Cl.
USPC .......................................... 382/154; 345/420

(58) Field of Classification Search
USPC .......................................... 382/154; 345/420
See application file for complete search history.

(56) References Cited

U.S. PATENT DOCUMENTS

| | | | | |
|---|---|---|---|---|
| 5,202,928 A * | 4/1993 | Tomita et al. | ................. | 382/154 |
| 5,546,524 A * | 8/1996 | Chow et al. | .................... | 715/782 |
| 5,579,464 A * | 11/1996 | Saito et al. | ..................... | 345/441 |
| 5,831,630 A * | 11/1998 | Ono | ............................... | 345/650 |
| 5,926,575 A * | 7/1999 | Ohzeki et al. | ................. | 382/243 |
| 6,025,847 A * | 2/2000 | Marks | ........................... | 345/419 |
| 6,046,745 A * | 4/2000 | Moriya et al. | ................ | 345/420 |
| 6,084,586 A * | 7/2000 | Ooka et al. | ..................... | 345/419 |
| 6,246,412 B1 * | 6/2001 | Shum et al. | .................... | 345/419 |
| 6,308,144 B1 * | 10/2001 | Bronfeld et al. | .................. | 703/2 |
| 6,333,749 B1 * | 12/2001 | Reinhardt et al. | ............ | 345/629 |
| 6,421,049 B1 * | 7/2002 | Reinhardt et al. | ............ | 345/420 |
| 6,529,626 B1 * | 3/2003 | Watanabe et al. | ............ | 382/154 |
| 6,545,673 B1 * | 4/2003 | Shiitani et al. | ................ | 345/418 |
| 6,549,201 B1 * | 4/2003 | Igarashi et al. | ............... | 345/423 |
| 7,034,821 B2 * | 4/2006 | Baumberg | ...................... | 345/419 |
| 7,142,726 B2 * | 11/2006 | Ziegler et al. | ................. | 382/285 |
| 7,184,047 B1 * | 2/2007 | Crampton | ...................... | 345/473 |
| 7,193,633 B1 * | 3/2007 | Reinhardt et al. | ............ | 345/629 |
| 7,508,977 B2 * | 3/2009 | Lyons et al. | .................. | 382/154 |

(Continued)

OTHER PUBLICATIONS

S. Gibson et al., "Interactive reconstruction of virtual environments from video sequences", Computers and Graphics, 27, 2003, pp. 293-301.

(Continued)

*Primary Examiner* — Kathleen Y Dulaney
(74) *Attorney, Agent, or Firm* — Greenblum & Bernstein, P.L.C.

(57) ABSTRACT

A method for generating a three dimensional (3D) model of an object is depicted in a two dimensional (2D) image is disclosed, The 2D image includes associated 3D information. The method includes an operator determining a geometric primitive corresponding to shape characteristics of the object and then the generation of the 3D model based on the determined geometric primitive, the 2D image, and the associated 3D information.

10 Claims, 13 Drawing Sheets

(56) References Cited

U.S. PATENT DOCUMENTS

| | | | | |
|---|---|---|---|---|
| 7,567,713 | B2* | 7/2009 | Ding | 382/199 |
| 7,602,404 | B1* | 10/2009 | Reinhardt et al. | 345/629 |
| 7,720,276 | B1* | 5/2010 | Korobkin | 382/154 |
| 8,014,589 | B2* | 9/2011 | Andres Del Valle | 382/154 |
| 2002/0080139 | A1* | 6/2002 | Koo et al. | 345/473 |
| 2003/0201992 | A1* | 10/2003 | Wang et al. | 345/420 |
| 2004/0184655 | A1* | 9/2004 | Ziegler et al. | 382/154 |
| 2004/0247174 | A1* | 12/2004 | Lyons et al. | 382/154 |
| 2005/0140670 | A1* | 6/2005 | Wu et al. | 345/419 |
| 2005/0213808 | A1* | 9/2005 | Ohtomo et al. | 382/154 |
| 2006/0120582 | A1* | 6/2006 | Squilla et al. | 382/128 |
| 2006/0165268 | A1* | 7/2006 | Kaus et al. | 382/128 |
| 2007/0146359 | A1* | 6/2007 | Togawa | 345/419 |
| 2007/0183666 | A1* | 8/2007 | Ding | 382/199 |
| 2008/0013860 | A1* | 1/2008 | Blanco | 382/285 |
| 2008/0267490 | A1* | 10/2008 | Gorges et al. | 382/154 |

OTHER PUBLICATIONS

Paul E. Debevec et al., "Modeling and rendering architecture from photographs: A hybrid geometry—and image-based approach", in proceedings of the 23$^{rd}$ annual conference on Computer graphics and interactive techniques, 1996, pp. 1-10.

Paul E. Debevec et al., Image-based modeling and rendering of architecture with interactive photogrammetry and view-dependent texture mapping, in proceedings of the 1998 IEEE International Symposium on Circuits and Systems, 1998.

Remo Ziegler et a., 3D Reconstruction using labeled image regions, in Proceedings of the 2003 Eurographics/ACM SIGGRAPH Symposium on Geometry Processing, 2003.

Sabry El-Hakim et al., 3D modelling with reusable and integrated building blocks, in 7$^{th}$ Conference on Optical 3-D Measurement Techniques, Oct. 3-5, 2005.

Pierre Poulin et al., "Interactively Modeling with Photogrammetry", in Eurographics Workshop on Rendering, 1998.

Anton John Van Den Hengel et al., "Rapid Interactive Modelling from video with Graph Cuts", Eurographics 2006, Sep. 2006, Vienna, Austria.

Anton John Van Den Hengel et al., "Building Models of Regular Scenes from Structure-and-Motion", The Seventeenth British Machine Vision Conference (BMVC 2006), Sep. 2006, Edinburgh, United Kingdom.

A. van den Hengel et al., "Hierarchical Model Fitting to 2D and 3D Data", Third International Conference on Computer Graphics, Imaging and Visualisation, IEEE Computer Society Press, Jul. 2006, Sydney, Australia.

A. van den Hengel et al., "Fitting Multiple Models to Multiple Images with Minimal User Interaction", International Workshop on the Representation and Use of Prior Knowledge in Vision (WRUPKV) held in association with ECCV'06, May 2006, Graz, Austria.

T. Thormählen, "Robust Estimation of Camera Motion From Image Sequences", PhD thesis, University of Hannover, 2006, together with an English language Abstract thereof.

P. Huber, "Robust Estimation of a Location Parameter", Annals of Mathematical Statistics, 35:73-101, 1964.

N. Daucher et al., "Modelled Object Pose Estimation and Tracking by Monocular Vision", in BMVC93, pp. 249-258, 1993.

Paul Smith et al., "Motion Segmentation by Tracking Edge Information over Multiple Frames", in ECCV (2), pp. 396-410, 2000.

S. Baker et al., "A Layered Approach to Stereo Reconstruction", In Proc. IEEE Computer Vision and Pattern Recognition, pp. 434-441, 1998.

Australia Office action, mail date is Feb. 16, 2012.

\* cited by examiner

METHOD AND SYSTEM FOR GENERATING A 3D MODEL

TECHNICAL FIELD

The present invention relates to image processing and analysis. In a particular form the present invention relates to the generation of a three dimensional (3D) model from a two dimensional (2D) image.

INCORPORATION BY REFERENCE

The entire content of each of the following documents is hereby incorporated by reference.

*Rapid Interactive Modelling from Video with Graph Cuts*, Anton van den Hengel, Anthony Dick, Thorsten Thormählen, Ben Ward, and Philip H. S. Torr, Eurographics 2006, September 2006, Vienna, Austria.

*Building Models of Regular Scenes from Structure-and-Motion*, Anton van den Hengel, Anthony Dick, Thorsten Thormählen, Ben Ward, Philip H. S. Torr, The Seventeenth British Machine Vision Conference (BMVC 2006), September 2006, Edinburgh, United Kingdom.

*Hierarchical Model Fitting to 2D and 3D Data*, A. van den Hengel, A. Dick, T. Thormaehlen, B. Ward, P. H. S. Torr, Third International Conference on Computer Graphics, Imaging and Visualisation, IEEE Computer Society Press, July 2006, Sydney, Australia.

*Fitting Multiple Models to Multiple Images with Minimal User Interaction*, A. van den Hengel, A. Dick, T. Thormaehlen, P. H. S. Torr, B. Ward, International Workshop on the Representation and Use of Prior Knowledge in Vision (WRUPKV) held in association with ECCV'06, May 2006, Graz, Austria.

The following documents are referred to in the following description:

*Robust Estimation of Camera Motion From Image Sequences*, T. Thormählen, PhD thesis, University of Hannover, 2006.

*Robust Estimation of a Location Parameter* P. Huber, Annals of Mathematical Statistics, 35:73-101, 1964.

*Modelled Object Pose Estimation and Tracking by Monocular Vision*, N. Daucher, M. Dhome, J. T. Lapreste, and G. Rives, In BMVC93, pages 249-258, 1993.

*Motion Segmentation by Tracking Edge Information over Multiple Frames*, Paul Smith, Tom Drummond, and Roberto Cipolla, in ECCV (2), pages 396-410, 2000.

*A Layered Approach to Stereo Reconstruction*, S. Baker, R. Szeliski, and P. Anandan, In Proc. IEEE Computer Vision and Pattern Recognition, pages 434-441, 1998.

The entire content of each of these documents is hereby incorporated by reference.

BACKGROUND

It has long been a goal to be able to extract 3D information in the form of a 3D model of an object from a 2D image as a 3D model provides an entity with greatly enhanced capabilities for manipulation when compared with a point based model. In addition, 3D models of an object based on geometric primitives such as cubes, spheres and even conformable volumes made up of spline surfaces may be parameterized efficiently, thereby reducing the data storage required to store these objects. Furthermore, 3D models based on geometric primitives also allow these models and hence the objects they represent to be inserted into, and removed from image sets and artificial environments such as video games or simulation systems.

In the case of a sequence of images such as those provided by a moving camera viewing a scene, structure from motion (SFM) techniques have been developed which attempt to automatically locate corresponding points on a sequence of images. A corresponding point on a sequence of images is the set of points that correspond to the same physical location within each image.

These points are obtained by processing a first image to locate a point such as the corner of a building and then processing subsequent images to locate that same point. From this process, 3D information may be generated in the form of a point cloud that relates the 3D position of points visible within a sequence of images. This process also provides relative camera location and orientation. Whilst this technique is able to provide some relevant 3D information, it fails to provide higher level structural information in relation to a scene other than a cloud of points located in a scene space.

Methods exist which aid the SFM process by allowing an operator to manually identify corresponding points in a sequence of images, thereby constraining the SFM analysis. Reconstructed points generated through the resulting SFM process can then be joined by lines, and the lines can be further used to define surfaces and so on to potentially generate a 3D model of an object with scene. However, as would be apparent to those skilled in the art, this process is extremely manually intensive and in many circumstances the point cloud will not encompass relevant objects of interest, as the initial image processing is unable to extract 3D point information for those objects.

In another example of a method that attempts to generate a 3D model from one or more 2D images that include associated 3D information such as a point cloud generated from SFM techniques, an operator manually positions a geometric primitive to visually line up with an object of interest. Once this geometrical primitive (e.g. a cube) has been manually aligned in one or more images, it is then taken to define a 3D model of that object. However, this technique suffers from the significant drawback that it relies on the operator to be able to manually define and align the appropriate geometric primitive and often this process must be carried out over multiple images in order to properly constrain the 3D model.

Accordingly, there is a need to provide an alternative method for generating 3D models from 2D images.

SUMMARY

In a first aspect, the present invention accordingly provides a method for generating a three dimensional (3D) model of an object depicted in a two dimensional (2D) image, the 2D image having associated 3D information, the method including:

an operator determining a geometric primitive corresponding to shape characteristics of the object; and generating the 3D model based on the geometric primitive, the 2D image, and the associated 3D information.

In a second aspect, the present invention accordingly provides a method for generating a first 3D model and a second 3D model of corresponding first and a second objects both depicted in a 2D image, the 2D image having associated 3D information, the method including:

an operator determining geometric primitives that correspond to shape characteristics of the first and second objects;

an operator characterizing a relationship between the first and second objects; and generating 3D models for the first and second objects based on the geometric primitives, the 2D image, the associated 3D information and the characterized relationship.

In a third aspect, the present invention accordingly provides a method for facilitating the generation of a series of 3D models corresponding to a set of substantially similar objects depicted in a 2D image, the 2D image having associated 3D information, the method including:

generating a first 3D model of a first object from the set of substantially similar objects an operator providing an indication on the 2D image as to the location of the remaining substantially similar objects; and generating the 3D models for the remaining substantially similar objects based on the first 3D model and the indication.

BRIEF DESCRIPTION OF THE DRAWINGS

Embodiments of the present invention will be discussed with reference to the accompanying drawings wherein.

Figure 1:
FIG. 1 is a screen image depicting the interactive selection by an operator of a first collection of points corresponding to a first geometric primitive according to a first exemplary embodiment of the present invention.

The drawings in the present application and their accompanying detailed description are directed to merely example embodiments of the invention. To maintain brevity, other embodiments of the invention which use the principles of the invention are not specifically described in the present application and are not specifically illustrated by the present drawings.

DESCRIPTION

The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The method of the invention in one exemplary form requires as input one or more images, information describing the state of the camera as each image was taken, and the locations of a set of 3D points on the surfaces of objects in the scene for that image. In an exemplary form, the information required about the state of the camera is the position, orientation, and internal characteristics of the camera by which each of the input images was captured. As stated above, the set of images may contain only one image.

The input required may thus be derived from a number of sources, including for example, the application of structure-from-motion (SFM) techniques to an image set, or the use of a laser scanner with a camera attached.

For the purposes of the following description the following mathematical formalism is adopted. Using homogeneous coordinates, a 3D object point is represented as $p=(P_1, P_2, P_3, 1)^T$ and a 2D image feature point as $p=(p_1, p_2, 1)^T$. The feature point $p_{i,k}$ is the projection of a 3D object point $P_i$ in the k-th camera image, with $P_{i,k}:A_k P_i$, where $A_k$ is the 3×4 camera matrix of the k-th camera image and a:b indicates that the vectors a and b are equal up to a scale factor. For each image of the sequence, the camera matrix $A_k$ contains the camera's intrinsic parameters such as focal length and principal point, as well as its extrinsic position and orientation parameters.

The process used for estimation of $A_k$ and $P_i$ is consistent with modern SFM techniques (see for example T. Thormählen, *Robust Estimation of Camera Motion From Image Sequences*. PhD thesis, University of Hannover, 2006, hereby expressly incorporated by reference in its entirety). This process produces estimates of the pose and internal parameters of each camera, and of the 3D position of a set of feature points in the scene.

A first exemplary embodiment of the invention will now be described whereby a user may generate a 3D model by clicking once on a point within the area within a single image corresponding to the projection of the object from which the corresponding 3D model is to be generated. The word "exemplary" is used exclusively herein to mean "serving as an example, instance or illustration." Any embodiment described herein as "exemplary" is not necessarily to be construed as preferred or advantageous over other embodiments.

A geometric primitive that is to be generated is defined by an identifying label (for example, it might be a cube or a sphere). Throughout this specification the term "geometric primitive" is taken to mean an idealized representation of the shape of an object that includes high-level shape information. Some examples include idealized representations of planes, cubes, and spheres and more generally conformable 3D objects that can be represented parametrically. Moreover, more complex geometric primitives may be constructed by joining multiple geometric primitives into a combined shape.

Each instance of a geometric primitive M is identified by a vector of parameters sharing the same label. The form of this parameter vector depends on the geometric primitive type. In the case of a cube, for example, the parameters define the cube's position, scale, and orientation in 3D space. Thus in this exemplary embodiment the aim of the method is to find parameter values that are most probable given the data D (images and 3D points) and any prior information I (which will be described) i.e. to maximise $$Pr(M|DI) \propto Pr(D|MI)Pr(M|I). \qquad (1)$$

The data is partitioned into 2D and 3D feature sets $D_2$ and $D_3$, and while $Pr(D_3|MI)$ and $Pr(D_2|MI)$ may not be independent, the relationship between the two is so complex that anything other than the uniform density function would be difficult to justify for $Pr(D_3|D_2MI)$. Accordingly, it can be seen that $$Pr(D|MI) \propto Pr(D_3|MI)Pr(D_2|MI) \qquad (2)$$

As part of the geometric primitive definition both of these likelihood functions are defined, and the prior distribution Pr(I). The 3D likelihood function defines the probability of a set of geometric primitive parameters given a set of 3D points, and typically favours parameters that result in many 3D points lying close to or on the model surface. The 2D likelihood function defines the probability of geometric primitive parameters given the images, this process typically favouring image edges near the projections of the geometric primitive's edges, and incorporates any appearance information that is known about the geometric primitive. Examples of such functions are described later.

Because the definition of a geometric primitive is quite general, the method is naturally capable of fitting a range of primitives, and also of fitting families of primitives. A simple geometric primitive, for example, might be a plane or sphere. More complex geometric primitives can involve entities with non-parametric descriptors, or families of entities and the relationships between them.

In order to explain the modelling and localisation process, in this first exemplary embodiment a simple cube geometric primitive example is employed. The cube primitive has a vector of 7 parameters C describing its 3 dimensional shape: the position of its centroid $T=[T_x,T_y,T_z]$, its orientation R, corresponding to Euler angles $[R_x,R_y,R_z]$, and its side length S.

A definition for $Pr(D_3|MI)$ is first considered i.e. the likelihood of a 3D point cloud given a particular cube primitive. The likelihood of each point given a cube primitive is closely related to the distance from that point to the cube. For a point in the interior of the cube, the distance to the cube is simply the perpendicular distance to the closest face of the cube. For a point outside the cube, the distance may be the diagonal distance to a corner of the cube. However, it is also well approximated as the perpendicular distance to the plane containing the nearest face of the cube. The problem therefore becomes one of determining the closest face to a point.

To solve this problem, the point is transformed into a coordinate system aligned with the cube: $P_C=RP+T$ where R and T are the cube orientation matrix and centroid position respectively. Now if this space is divided according to which face of the cube is closest, then this results in 6 regions that are bounded by rays emanating from the centre of the cube and passing through each vertex of the cube. Testing which of these regions contains the point is very simple: if $P_C=[X_C, Y_C, Z_C]$, one region is exactly the set of points where $X_C$ is greater than $Y_C$, $Z_C$, $-X_C$, $-Y_C$ and $-Z_C$. Similarly the other regions are composed of points where $Y_C$ is the maximum value, where $Z_C$ is the maximum, and where $-X_C$, $-Y_C$ and $-Z_C$ are the maximum.

Once $D_C=\max(X_C,Y_C,Z_C,-X_C,-Y_C,-Z_C)$ has been found, the distance from the point $P_i$ to the cube is simply $d_c(P_i,C)=D_C-S/2$, S being the cube side length. This distance can be squared so that points inside and outside the cube are treated symmetrically.

Of course not all 3D points belong to the primitive that is being fitted. To achieve robustness to points that are not part of the model, a Huber function (see for example P. Huber, *Robust Estimation of a Location Parameter*, Annals of Mathematical Statistics, 35:73-101, 1964, hereby expressly incorporated by reference in its entirety) is applied to the distance measure: $d(P_i,C)=\Psi(d_c(P_i,C))$. This also has the effect of segmenting the point cloud into those points belonging, and not belonging, to the cube according to their position.

Having constructed a distance measure between a point and a cube, a function for the likelihood of a set of 3D points given a cube model may now be defined. Assuming that all 3D points are mutually independent, the likelihood can be written as $Pr(D_3|MI)=\Pi_i Pr(P_i|MI)$ where $D_3=\{P_i\}$ is the set of reconstructed 3D points. Assuming a Gaussian error model, the negative log likelihood for a set of points $\{P_i\}$ where $i=1 \ldots n$ given a cube C is $$J_3(\{P_i\}, C) = f_3 \sum_i d(P_i, C)^2 \qquad (3)$$

where $f_3$ is a constant scale factor.

The 2-dimensional aspect of the model is based on the assumption that edges in the model will give rise to intensity gradients in the image. Edges have a number of advantages over corners or other features that might be used to guide model fitting. These advantages have been well discussed in the tracking literature (see for example N. Daucher, M. Dhome, J. T. Lapreste, and G. Rives, *Modelled Object Pose Estimation and Tracking by Monocular Vision*, In BMVC93, pages 249-258, 1993 and Paul Smith, Tom Drummond, and Roberto Cipolla, *Motion Segmentation by Tracking Edge Information over Multiple Frames*, in ECCV (2), pages 396-410, 2000, both of these publications hereby expressly incorporated by reference in their entirety) but include rapid detection and relative robustness to changes in lighting.

In order to calculate the degree to which a hypothesised cube model is supported by the image intensities the visible edges are projected back into the image set and a measure is taken of the corresponding intensity gradients. A series of normals to the edge are taken at points $\{E_\mu\}$ spaced equally along the original model edge. Points at the ends of the edge are discarded. The points $\{E_\mu\}$ are pre-computed and scaled according to the size of the cube model and then projected into the image to give $\{e_\mu\}$, $\mu=1 \ldots m$. This process avoids the bias towards edges close to the camera that might occur if calculations were made in image space.

At each point $e_\mu$ the normal to the reprojected model edge is taken and image gradients calculated along these lines. The points at which the gradients are calculated for a particular $e_\mu$ are labeled $n_{\mu\nu}$ where $\nu=-g \ldots g$ and $e_\mu=n_{\mu 0}$. The $2g+1$ gradients $\{n_{\mu\nu}\}$ are evenly spaced along the normal with the distance between them scaled by the distance between $e_\mu$ and its closest neighbour. Again, the aim is to avoid bias in the calculations. The gradients $\{I'(n_{\mu\nu})\}$, $\nu=-g+1 \ldots g-1$ are calculated using a central difference formula, on the basis of the image intensities $\{I(n_{\mu\nu})\}$.

The gradients are then weighted by $\exp(-v^2/s)$ where s is selected according to the scale of the edge expected. This scaling weights closer edges higher than those further away. The maximum of the weighted $I'(n_{\mu\nu})$ is then determined and the corresponding $|v|$ taken as the distance between the model and image edges for $e_\mu$. The sum of these distances is used as the measure of fit. Assuming a Gaussian error model, the negative log likelihood function is thus $$J_2(\{I_k\}, C) = f_2 \sum_k \sum_\mu \mathrm{argmax}_v \exp\left(-\frac{v^2}{s}\right) I'_k(n_{\mu\nu})^2 \quad (4)$$

where $f_2$ is a constant scale factor.

To demonstrate the generality of the geometric primitive definition process, we now consider the geometric primitive for a plane. This primitive has 4 parameters describing its normal and position: $N=[N_1, N_2, N_3, N_4]$. These parameters are defined such that for any point $P_i$ lying on the plane, $d_p(P_i, N) = N \cdot [P_i, 1] = 0$. For points not lying on the plane, $d_p$ is the perpendicular distance of the point to the plane. Once more assuming the independence of 3D data points, and a Gaussian model relating distance to likelihood, the negative log likelihood of the 3D data can be written as $$J_3(\{P_i\}, N) = f_{3p} \sum_i \Psi d_p(P_i, N)^2, \quad (5)$$

where $\Psi$ is the Huber function as described earlier.

The 2-dimensional likelihood of a plane is based on the assumption that the surface of the plane is largely unoccluded by objects not modelled and that it is a Lambertian surface and will therefore have the same appearance in each image. The projections of a point on the surface into each image are related by homographies, which can be calculated analytically from the camera projection matrices and the plane parameters (for example S. Baker, R. Szeliski, and P. Anandan, *A Layered Approach to Stereo Reconstruction*, In Proc. IEEE Computer Vision and Pattern Recognition, pages 434-441, 1998, hereby expressly incorporated by reference in its entirety).

The likelihood of each point on the surface of a hypothesised plane model is therefore related to the difference in pixel values at the projection of that point into each image in which it is visible. Initially, the cost function is taken as the variance of the pixel values. For most points on the plane, the variance is expected to be very similar and close to 0. The distribution of pixel variances is therefore modelled over the plane as a Laplacian. In this case the negative log likelihood is written as $$J_2(\{I_k\}, N) = f_{2p} \sum_Q |\mathrm{var}\{I_k(A_k Q)\}| \quad (6)$$

where Q iterates over points on the plane, and k iterates over cameras.

Having defined cube and plane primitives, and their associated likelihood functions, a method for fitting such primitives to 3D and image data is now described. It is not feasible to generate and evaluate a set of samples that would effectively explore $\Pr(D|MI)$. Instead, a coarse-to-fine strategy which exploits the nature of the functions $\Pr(D_3|MI)$ and $\Pr(D_2|MI)$ is used in order to guide our search for a suitable model.

The function $\Pr(D_3|MI)$ relates the model to a set of reconstructed points and is well suited to gross localisation of the object in the scene, due to the relatively smooth nature of the associated probability distribution. The function $\Pr(D_2|MI)$ relates the model to the appearance of the object in the image set, and is typically only applicable when the model is very close to the true location of the object. When this criterion is satisfied, however, it can achieve very precise localisation, as the associated probability distribution is typically strongly peaked. Thus the 3D likelihood function is better suited to initial localisation, while the 2D likelihood is appropriate for further optimisation based on this initial estimate.

In an initialization procedure, the first stage of the method requires that the user identify a point on the object to be modeled in any of the input images. It is not necessary to identify a corner or an edge; rather, the point merely identifies a ray through the reconstruction which intersects the object of interest. As would be apparent to those skilled in the art, a single ray through the scene provides the maximum information from minimal user interaction.

A series of simple templates is spaced along this ray. The idea of the template $T(\{P_i\},C,r)$ is to calculate the likelihood of a set of points $\{P_i\}$, $i=1 \ldots n$, given a cube with centre C and radius r, integrated over all cube orientations. The radius is taken to be half of the side length of the cube. This function can be evaluated in the form $T(\{P_i\},C,r)=\Sigma_i w(d(P_i,C),r)$, where $w(\ )$ is a density function representing the distance from the centre of a cube to a set of points equally spaced over the surface of a cube.

By generating such a point set for a cube of radius 1, it was determined that this function can be closely approximated by a Gaussian distribution with mean 1.28 and standard deviation 0.162. Given that the ray identified by the user does not necessarily intersect the centre of the cube we require a Gaussian smoothed version of this density. It has been determined empirically that a value of 0.3 provides acceptable results for a cube of radius 1.

Multiplying the function $w(d(P_i,C),r)$ by a scale factor common to all points has no effect on the ordering of the results, so the absolute scale of the function may be ignored. We thus let $w(d(P_i,C),r)=\exp(-(d(P_i,C)/r-1.28)^2/0.18)$.

It is assumed that the object sought will fill at least 1% and less than 100% of the image used to identify it. This forms part of the cube model prior $\Pr(I)$, and provides a constraint upon the range of template radii that should be searched at each point along the intersecting ray. A set of hypothetical object sizes is chosen within this range and for each size a set of points along the ray are selected to form the template centres for that object size. The radius of each template is calculated independently for each point along the ray and increases with the distance from the camera.

The distance between template centres increases with the calculated radius, and thus also with the distance to the camera. The function $T(\{P_i\},C,r)$ is evaluated for each template and the parameter vectors corresponding to function evaluations above the 90th percentile retained. These parameter vectors are used to initialise the optimisation process.

The next stage is the optimization stage. Each initial parameter vector specifies the centre and radius of a hypothesised cube. This information is used to initialise an iterative search process based upon the likelihood function $J_3(\{P_i\},C)$ specified in Equation (3). In order to evaluate this function an orientation is required for the cube hypothesis. This orientation is initialised to be aligned with the camera coordinate system.

A Levenberg Marquardt minimisation process is carried out on the cost function $J_3(\{P_i\},C)$. The result of this minimisation is a parameter vector describing the location, radius, and orientation of a cube hypothesis. One such parameter vector is recovered for each initialisation. These vectors are checked to ensure that they are significantly different from each other and that they intersect the ray specified by the user. The remaining parameter vectors may be interpreted as identifying the local modes of the probability density function associated with $Pr(D_3|MI)Pr(M|I)$.

Having explored $Pr(D_3|MI)$, $Pr(D_2|MI)$ is now incorporated in order to find the modes of $Pr(D|MI)$. The 2-dimensional data likelihood of the model is as described earlier, and gives rise to the cost function $J_2(\{I_k\},C)$ (see Equation (4)). Recall that this cost function is based on the image distance between the projected edge of the geometric primitive and the local intensity gradient maximum normal to the edge, summed across multiple points along each edge.

The 2D and 3D likelihood functions can now be combined to generate a complete data likelihood function. Because they are both log likelihoods, they are combined by addition; however because they are not normalized, a scale factor is required to ensure that they each contribute appropriately to the final likelihood. Because the 2D data likelihood is more sensitive to small changes in the cube parameters, it tends to dominate this final optimisation stage, which is appropriate as the image data is more specific than the 3D data.

The next stage is an operator selection stage or process as the result of the optimisation process is a set of possible object model hypotheses (i.e. geometric primitives that have been generated by the method in an attempted fit to an object). Each object model hypothesis in the set is compared against every other to eliminate those similar enough to be labeled duplicates. The remaining set is passed on to the operator for examination and selection. This set is expected to contain a small number of possible object model hypotheses (often only one), one of which will be very close to that required.

In order to facilitate user interrogation of the set of returned hypotheses, each is rendered and displayed onto the image set. The operator may then select between the various individual object hypotheses using the mouse wheel. The selected object model hypothesis is highlighted by being rendered in a different colour. One of the object model hypotheses is typically a very good fit to the image data.

In some circumstances, however, the accuracy achieved by the method may not be suitable for the desired application. In these circumstances it is appropriate to provide a means of refining the fit to the point whereby the desired level of accuracy may be guaranteed.

At the operator refining stage further operator interaction may be used to further inform the fitting process. As with the earlier stages, the goal is to minimise the tedium associated with this process by extracting the maximum value from each interaction. This requires that automation decrease intelligently as the level of user interaction increases.

After the best fitting object model is selected by the process described previously it is rendered onto the image or image set. The user then selects an image from the set in which to carry out the object manipulation functions. Editing is performed by moving a vertex of the object model hypothesis so as to best align its projection with the image. This drag-and-drop operation is performed on as many vertices as necessary to achieve the desired accuracy of fit.

Let the position of the selected 3-dimensional object model hypothesis vertex be $V_\gamma(C)$, and its desired position in image k be $a_{\gamma,k}$. It is now desired to calculate the transformation that would need to be made to the object model hypothesis's parameters C in order to align the projection of $V_\gamma(C)$ into image k with $a_{\gamma,k}$.

If the camera matrix for image k is $A_k$ the distance between the desired vertex location $a_{\gamma,k}$ and the object model hypothesis vertex projection $V_\gamma(C)$ is labeled as $d_U(a_{\gamma,k}, A_k V_\gamma(C))$. Again assuming a Gaussian error model the negative log likelihood of a set of user specified vertex projection points $a=\{a_{\gamma,k}\}$ given an object C is $$J_U(a, C) = f_U \sum_{a_{\gamma,k} \in a} d_U(a_{\gamma,k}, A_k V_\gamma(C))^2. \quad (7)$$

The fact that this cost function takes the form of a negative log-likelihood means that it may be combined with $J_3(\{P_i\},C)$ and $J_2(\{I_k\},C)$ in order to derive a combined data likelihood equation. This requires that appropriate values be selected for the various scale factors, which is done under the assumption that data provided by the user is unlikely to be in error except for the smallest of distances. The final model estimate is calculated by minimising this joint cost function.

Numerical minimisation of this complex cost function is unfortunately too slow a process to be carried out while the user drags a vertex across an image. Thus, in order to provide the user with an impression of the effect of manipulating the vertices of the object, the projection of the object model hypothesis into the current image is updated using a simplified version of this full likelihood. If the user is editing the location of vertex $V_\gamma$ of an object model hypothesis $C_O$ in image k, then the parameters of the object model hypothesis projected into the image are determined by $$C'_N = \mathrm{argmin}_{C_N} J_U(\{a_{\gamma,k}\},C_N) + P C_N - C_O P. \quad (8)$$

The parameter vector $C'_N$ thus represents the object model hypothesis containing the newly specified vertex location which is closest to the best existing model estimate. Equation (8) may be evaluated quickly using numerical minimisation.

As would be apparent to those skilled in the art, this exemplary embodiment provides important advantages over the prior art in that an operator of a computer software program embodying the method is able to employ the ability of an operator to visually select, manipulate and modify a 3D geometric primitive making use of the operator's innate understanding of a scene in terms of the 3D being depicted in the image and furthermore that this information is combined with analysis of the 2D image data to generate the resultant 3D model.

In a second exemplary embodiment of the present invention an operator is able to generate multiple 3D models corresponding to multiple objects in one or more images. In one form, an operator is able to specify the relationships between objects and hence their geometric primitives and this information is employed to generate combined 3D models that fit to the 2D image data.

As described earlier, a geometric primitive describes a particular class of object (for example, it might be a cube or a sphere), and each object of interest in a scene is identified with a corresponding instance of a geometric primitive. Each such instance is identified by a label such as M, we also use to identify the vector of parameters associated with that instance.

The form of the parameter vector associated with a geometric primitive depends on its class. In general, the definition of any geometric primitive includes a position T and a scale S. For a simple geometric primitive such as a sphere, this may be all that is required. However, in general, geometric primitives will also contain other parameters specifying their orientation, elongation and other relevant geometric properties. The geometric primitives can be organized hierarchically according to their parameters, a child geometric primitive inheriting the parameters of its parent, and adding extra parameters specific to it. This allows us to formulate a general strategy for fitting geometric primitives to data, as will be described herein.

As one illustrative example of a geometric primitive, the bounded plane has a position T which is a point on the boundary of the plane. The plane is further defined by two orthogonal unit vectors U and V that intersect at T and belong to the plane. The scale S has a different meaning depending on the shape of the plane. If it is a general shape, there are two scale factors $S_{i,u}$ and $S_{i,v}$ for each point $P_i$ on the boundary. The boundary of the plane is defined as a sequence of points enumerated in a counterclockwise direction when looking along the plane normal.

The points are defined in terms of the plane position and scale, and the vectors U and V: $P=T+S_{i,u}U+S_{i,v}V$. If it is a more regular shape, such as a square, the scale factors are shared between boundary points. In the case of a square there is only a single scale factor S which defines each of the 4 boundary points (T, T+SU, T+SU+SV, and T+SV).

In a further example, many geometric primitives can be constructed as a set of bounded planes. A cuboid, for example, is made up of 6 rectangular bounded planes meeting at right angles, where opposing planes are the same size and have opposing normals. The parameters of the cuboid, [T, U, V, $S_1$, $S_2$, $S_3$], in turn define the parameters of the planes. In general, more complex geometric primitives can be constructed from simple ones by specifying hierarchically that the parameters of each of the constituent geometric primitives depend on another set of parameters that is global to the complex object. Spheres and other polyhedra can also be modelled in this way.

There are a wide variety of relationships that might exist between even the small set of geometric primitives outlined above. These relationships are defined in terms of parameters of the geometric primitives. One particularly important relationship is "abutting", which means that two geometric primitives or the objects that are to be modeled have a face in common. This relationship can be used to represent the very common situation of one geometric primitive resting on top of another. Other relationships are important for particular types of scene. For office scenes "edge aligned" is particularly important, and if multiple repeated objects are to be considered then so are "co-linear" and "equally spaced". Thus the ability to define relationships between geometric primitives based on the relationships between the objects that are being modeled and to have these relationships form part of the generation of the resultant composite 3D models is an especially advantageous aspect of this exemplary embodiment.

In the context of this exemplary embodiment these relationships are encoded probabilistically. The aim is to find the set of geometric primitives $M=\{M_i: i=1 \ldots N\}$ that are most probable given the data D (images, camera parameters and 3D points) and any prior information I. The estimation problem is represented as a Markov Random Field (MRF) with a hidden node corresponding to each geometric primitive in the composite model and an observed node for each such geometric primitive. Hidden nodes are also added to capture the object-group relationships. Observed nodes are linked to the corresponding geometric primitive nodes, as would be expected, with the pair-wise relationships between geometric primitives providing the links between the corresponding geometric primitive nodes in the graph.

The Hammersley-Clifford theorem states that the joint probability over the geometrical primitive set M can be factorized as the (normalised) product of the individual clique potential functions of the graph formed by the nodes and their links (see for example J. Besag, *Spatial Interaction and Statistical Analysis of Lattice Systems*, Journal of the Royal Statistical Society, Series B (Methodological), 32(2):192-236, 1974, hereby expressly incorporated by reference in its entirety).

The cliques in this case are all of size 2. The potential function adopted for the cliques containing an observed node and a geometric primitive node is based on the probability of the geometric primitive given the observation and the prior. For a geometric primitive M, $$Pr(M|DI) \propto Pr(D|MI)Pr(M|I). \quad (9)$$

It is the right hand side of this expression which forms the clique potential function for cliques containing an observed node and a geometric primitive node.

The potential function for cliques which represent pair-wise relationships between two geometric primitives M and N is the joint probability: Pr(M,N). The potential function for cliques representing object-group relationships is similarly the joint probability Pr(M,R) of the geometric primitive M and the relationship R.

The full joint probability of the set of geometric primitives M and the set of object-group relationships R given the data set D and the prior information I is thus $$Pr(M|DI) = \frac{1}{Z} \prod_{M \in \mathcal{M}} Pr(D|MI)Pr(M|I) \prod_{N \in N_M} Pr(M,N) \prod_{R \in R_M} Pr(M,R), \quad (10)$$

where $N_M$ represents the set of nodes N connected to M with $\phi(M) > \phi(N)$. The function $\phi(\cdot)$ provides an ordering on nodes in order to ensure that each clique potential function is counted only once as is required under the Hammersley-Clifford Theorem. The set $R_M$ represents the set of object-group relationships involving M, and the scalar Z a constant chosen such that Pr(M|DI) integrates to 1.

As such, the method operates to find M that maximises the joint probability. Because the joint is a product of probabilities, log Pr(M|DI), whose extrema coincide with those of Pr(M|DI), can be written as a sum of log probabilities. In this exemplary embodiment, the negative log joint probability (i.e. the sum of the negative logs of the terms on the right hand side of Equation (10)) is minimized, this being more convenient to work with computationally as described in the next section.

The calculation of the likelihood term Pr(D|MI) in Equation (10) is now described in more detail. There are in fact a number of likelihood functions that might be used to measure the degree of correspondence between a geometric primitive and the data. Each likelihood gives rise to a different interpretation of the joint probability. Here two such functions are described, one based on the 3D point cloud and the other on the image data.

As described previously, the data consists of a set of images of a scene (called $D_2$), the camera parameters Dc and some 3D points in the scene $D_3$. It is often useful to fit a geometric primitive first to the 3D point cloud, and then to refine the estimate using the image data more directly.

One possible likelihood for each point is based on the re-projection error (i.e. the distance between points measured by projection into each input image). Let $P_M$ be the point on the surface of the geometric primitive M which is closest to the reconstructed data point P. Labeling the projection of a 3 D point P into image I as p(P,I) then the distance between p(P,I) and $P(P_M,I)$ is sought to be measured in each of the images that were used in the estimation of P. The distance in image I is $$d_2(p(P,I),p(P_M,I)) \quad (11)$$

where $d_2(\cdot,\cdot)$ represents the Euclidean 2 D image-based distance. Not all points in the reconstruction necessarily belong to the model that is being fitted, so a Huber function $h(\cdot)$ is applied to the distance measure, to diminish the influence of points far from the geometric primitive. The distance measure for a 3D point P thus becomes $h(d_2(p(P,I), p(P_M,I)))$.

Now labeling the set of images containing the features from which point P was calculated as $K_P$, and assuming that the reprojection errors conform to a Gaussian distribution, the negative log likelihood of a set of 3D points P given a geometric primitive M is then $$J_3(P, M) = -\log Pr(D_3 \mid MI) \quad (12)$$
$$= f_3 \sum_{P \in P} \sum_{I \in K_P} h(d_2(p(P, I), p(P_M, I)))$$

where $f_3$ is a constant scale factor. This assumes that the reconstructed points $D_3=\{P_i\}$ are conditionally independent given the geometric primitive M. The likelihood $Pr(D_3|MI)$ is substituted into (10) to form $Pr(M|D_3I)$ which is used to initialise the geometric primitive fitting process.

Other likelihood functions are able to use the image data more directly, rather than the 3D point cloud derived from it. One such likelihood is based on the assumption that the edges of a geometric primitive will give rise to intensity gradients in the image. Edges have a number of advantages over corners or other features that might be used to guide geometric primitive fitting, including rapid detection and relative robustness to changes in lighting.

In order to calculate the degree to which a hypothesised geometric primitive is supported by the image intensities, the visible edges are projected back into the image set and the negative log likelihood $J_2(D_2,M)=-\log Pr(D_2|MI)$ is measured by the weighted distance to local intensity gradient maxima (see for example A. van den Hengel, A. Dick, T. Thormaehlen, P. H. S. Torr, and B. Ward, *Fitting Multiple Models to Multiple Images with Minimal User Interaction*, Proc. International Workshop on the Representation and use of Prior Knowledge in Vision (WRUPKV), in conjunction with ECCV'06, May 2006, hereby expressly incorporated by reference in its entirety). The likelihood $Pr(D_2|MI)$, is substituted into Equation (10) to form $Pr(M|D_2I)$ which is then used to refine the final fit.

The "abutting" relationship is captured by a distribution over the parameters of the two geometric primitives with its peak at the point corresponding to the co-location of the objects' faces. In testing, a distribution has been used with parameters causing the intersection of the objects having zero probability and parameters causing the misalignment of the planes diminishing quadratically to zero.

The form of Equation (10) is based on cliques of size 2. In order to maintain this structure, "abutting" is the only relationship defined to exist between a pair of objects. All other relationships must be mediated by an intermediate node. Most other relationships either involve groups of more than 2 objects, or require some property of the group to be derived, and are thus more naturally represented as an identifiable node in the graph. The "co-linear" relationship, for example, requires the estimation of the line of best fit through the centres of the geometric primitives. The probability Pr(M, R) of a geometric primitive in a "co-linear" relationship decays as the distance of the geometric primitive from the current line estimate increases, according to a Gaussian distribution.

Having defined the representation of the geometric primitive, and the associated density functions, a method for fitting such geometric primitives to image data is now described. The final goal is to maximise the joint probability specified in Equation (10). Rather than using an iterative graph-based optimisation method, the aim is to generate a good initial estimate which is then improved through numerical optimisation. This is feasible because the graph is relatively simple, and ultimately the user can intervene (by adding more information) to ensure that the desired result is achieved.

Generating a suitable initial estimate is important to the success of the method. One approach to this problem might be to attempt a sample and test strategy, but the number of parameters involved preclude this as a means of effectively exploring Pr(D|MI). Instead, a strategy is used which exploits the nature of the functions $Pr(D_3|MI)$ and $Pr(D_2D_C|MI)$ and the constraints between geometric primitives to guide the search for a suitable initialisation.

The function $Pr(D_3|MI)$ relates the geometric primitive to a set of reconstructed points and is well suited to gross localisation of the object in the scene, due to the relatively smooth nature of the associated probability distribution. The function $Pr(D_2D_C|MI)$ relates the geometric primitive to the appearance of the object in the image set, and is typically only applicable when the geometric primitive is very close to the true location of the object. When this criterion is satisfied, however, it can achieve very precise localisation, as the associated probability distribution is typically strongly peaked. Thus the 3D likelihood function is better suited to initial localisation, while the 2D likelihood is appropriate for further optimisation based on this initial estimate.

The functions Pr(M,N) and Pr(M,R) from Equation (10) describe the relationships between the objects in the scene. Most objects of interest in a scene are expected to participate in such relationships, although this is not enforced as a criterion of reconstruction. The successful reconstruction of even a single object in a scene thus implies other areas that might be usefully interrogated. By following a chain of such implications a set of related objects can be identified without resorting to exhaustive search. This conditioning of future search on previous success is feasible in part because the process is interactive. The fact that the set of possible relationships is prescribed is also an enabling factor.

Referring now to FIG. 1, there is illustrated an application of the present invention in accordance with the second exemplary embodiment. The method for generating in this case a set of 3D models of objects in the series of images is initialized by the operator selecting an geographic primitive type (in this case a cuboid) from the set of geographic primitives and outlining an area in one of the images (in this case a bollard).

The set of 3 D points which reproject into this area in the selected image are taken to belong to an instance of the specified geographic primitive type. A numerical minimisation process is used to derive the parameters of the geometric primitive on the basis of the 3 D likelihood and this set of points. In this example, the result of this process is a geometric primitive which fits the 3 D data well, but does not match the underlying scene geometry accurately. This occurs due to the small number of reconstructed points associated with the bollard.

This problem can be solved, however, by manually adjusting the geometric primitive such as described in the first exemplary embodiment or additionally or alternatively by the addition of constraints such as described immediately above. The simplest constraint is that the cuboid is resting on the ground plane.

Figure 2:
FIG. 2 is a screen image depicting the interactive selection by an operator of a second collection of points corresponding to a second geometric primitive from the scene illustrated in FIG. 1.
Figure 3:
FIG. 3 is a screen image showing initial 3D models corresponding to the first and second geometric primitives as generated by the method according to the second exemplary embodiment of the present invention.

Referring now to FIG. 2, the operator selects a geometric primitive type corresponding to a plane and outlines a set of points located in the plane. Furthermore, an additional constraint is applied in that the previously identified cuboid corresponding to the bollard is identified as resting on the plane thereby specifying a relationship between individual geometric primitives. FIG. 3 depicts the initial estimate of the plane and cuboid primitives. As can be seen from the estimate achieved by considering both primitives and the relationship between them collectively shown in FIG. 3, the accuracy of the result is greatly enhanced.

This initial estimate can then be further refined by constructing an instance of the MRF-based cost function which represents the joint probability of the cuboid and the plane. Numerical minimization of the associated negative log of the posterior $Pr(M|D_3I)$ is then carried out.

Having successfully fit plane and cuboid geometric primitives to the data the resulting scene understanding is used to guide the remainder of the fitting process.

Figure 4:
FIG. 4 is a screen image showing multiple repeating geometric primitives being positioned along a line of replication as specified by an operator according to a third exemplary embodiment of the present invention.

Referring now to FIG. 4, there is shown a third exemplary embodiment applicable to generating 3D models of substantially similar objects in an image. In this example, to fit geometric primitives to the remaining cuboids in the scene the operator specifies that they are evenly spaced along a line. This information is recorded by the addition of an appropriate node to the MRF. The operator then selects a line of replication in the image. This line must be parallel to the plane, so there are 2 degrees of freedom in its specification, which is appropriate for an image-based interaction.

Figure 5:
FIG. 5 is a screen image showing further replication of the first optimized group.

Referring now to FIG. 5, instances of the cuboid model are generated along the line of replication as the operator moves the cursor. The instances are generated along the line so as to abut the previously identified plane, and are of the same size and orientation as the previously identified cuboids. Thus the only undetermined factor is the number of replications of the object.

There is only a range of numbers of replicas possible without overlap, and these can be evaluated by comparing the colour histograms of the object model hypotheses with that measured from the original cuboid. In this manner, the number of replicas is calculated automatically and it is thus not necessary to manually specify the number of replications of the object.

The hypothesized instances of the cuboid are rendered interactively, as they would appear when projected into the image with each instance appropriately constrained. It should be noted that without the camera and scene information recovered by the structure-and-motion process or equivalent 3D information this would not be possible.

The MRF at this point contains nodes for each of the objects, and a node representing the replication relationship. The plane node is connected to each cuboid by the "abutting" relationship. The replication node is connected to each of the cuboids. A numerical minimiser is applied to the negative log of an instance of $Pr(M|D_2I)$ representing this graph. The minimiser accurately models the 5 cuboids on the left of the scene. These cuboids, and the relationship that binds them, are then duplicated, and their representation in the image dragged toward the row of cuboids on the right of the scene (as best seen in FIG. 5).

The two rows are assumed to be parallel and to abut the plane, so once again there are only 2 degrees of freedom in this interaction. The parallelism constraint is not represented in the MRF, however, and thus disappears once this interaction is complete. The numerical minimiser is once again applied sequentially to the negative log of $Pr(M|D_3I)$ and $Pr(M|D_2I)$ resulting in the final scene parameterisation.

At any stage of the fitting process it is possible to manually add information to the posterior represented by Equation (10), and thus to affect the outcome of the various optimisations. This information is added in the form of the term $Pr(M|I)$ in Equation (10). The user adds this information by specifying the reprojection of an identified feature of a geometric primitive in a particular image.

As an example, the user might specify that the bottom left corner of a particular geometric primitive projects into a specific location in the third image. This is added as a further Gaussian term in the posterior and is thus easily incorporated into the estimation process.

As would be apparent to those skilled in the art, this process of building up geometric primitives and associated relationships greatly simplifies the process of generating a compound 3D model of a scene. The user interface operating in accordance with this exemplary embodiment interprets 2D interactions, largely generated through the mouse, so as to control the operation of the system in 3 or more dimensions. As is well known, a mouse is fundamentally a 2D interaction device, as it reports to the computer purely a set of (x, y) coordinates. Prior art methods of generating and manipulating 3D models, however, typically require the specification of higher-dimensional information.

As an example, to specify the placement of a cube in space both the location and orientation must be specified, which corresponds to a 5-dimensional piece of information. A number of techniques exist by which a 2D action may be used to generate a higher-dimensional interaction. However, in this exemplary embodiment an important advantage is that information recovered from the point cloud, image set, camera parameters or equivalent is being employed to guide the location and orientation process.

Replicating a shape a number of times along a ray, for example, requires the specification of the direction of the ray which is (a 2D operation), the distance along that ray that replication will occur (a 1D operation), and the number of replications (a 1D operation). Thus this operation has 4 degrees of freedom, and must be controlled by an input device which has only 2.

This is achieved by constraining the plane upon which the replicated object sits to derive the direction and distance along the ray. This plane is identified from image information as has been described previously. The number of replications is determined by analyzing the appearance of the object in the image and looking for objects with similar appearance along the ray.

In summary, the user interface interprets user interaction in the light of information gained through the analysis of the input image or the 3D point cloud, or both. This allows complex interactions with many degrees of freedom to be controlled intuitively and precisely using an input device (in this case a computer mouse) which has only 2 degrees of freedom. As an example, by analysing the image data, a plane may be identified within the scene. Objects identified as abutting that plane have a limited set of possible locations and orientations. Identifying the plane in the image set, or the point cloud, thus informs the placement of geometric primitives within the scene model.

Figure 6:
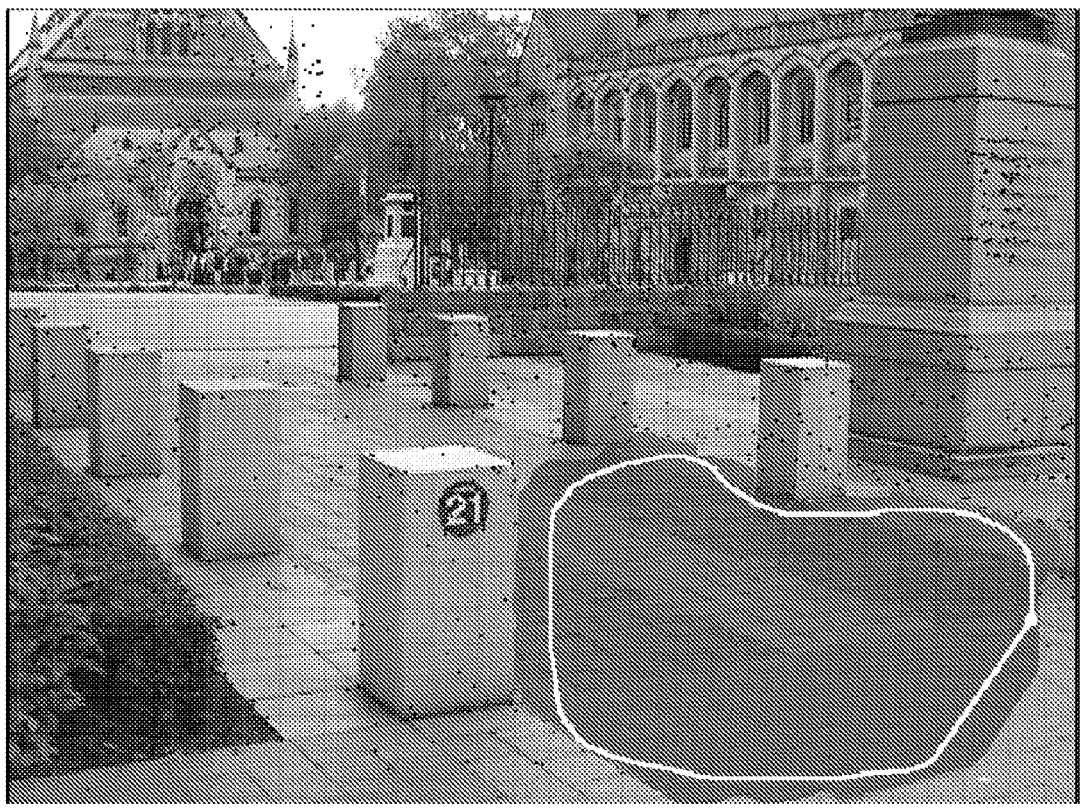
FIG. 6 is a screen image of an automated image segmentation process according to a fourth exemplary embodiment of the present invention.

Referring now to FIG. 6, a further fourth exemplary embodiment will now be described where the manner that an operator identifies the locations of objects in the image is modified. Once again the user initiates the fitting process by specifying a geometric primitive type, and highlighting the projection of the object to be modelled in one of the images. This requires that the user select a particular image from the input image set, and then simply draw a freehand line on the object of interest. The system then closes the curve if necessary.

As the curve is drawn, the system interactively attempts to segment the object of interest from the image. The appearance of the object is represented by a histogram of pixel values from within the currently selected region. This is compared with another histogram of pixel values from outside the region, by computing their Kullback-Leibler divergence. The segmentation we seek is that which maximises the divergence between the selected object and the background.

The segmentation is optimised using the graph cuts method for solving dynamic Markov Random Fields (see for example P. Kohli and P. H. S. Torr. *Efficiently Solving Dynamic Markov Random Fields Using Graph Cuts*, in Proceedings of Tenth IEEE International Conference on Computer Vision, October 2005, hereby expressly incorporated by reference in its entirety).

The efficiency of the method allows the segmentation to be updated quickly after the user completes the interaction. Part of this efficiency is achieved by initialising subsequent segmentations with the solution generated from the previous interaction. The speed with which these updates occur means that the user can start with quite a crude approximation and refine it only as far as is required.

As camera parameters and some 3D points are available, the region identified by the user and subsequently segmented can be used to determine an initial estimate of the parameters of the 3D object that projects into that area. In the case of the example shown in FIG. 6, the geometric primitive is a plane, and the plane parameters are estimated from the set of reconstructed points which project into the segmented area.

The negative log likelihood of the plane is proportional to the sum of squared distances between reconstructed points and the plane surface. Thus by minimising this distance we maximise the likelihood term in Equation (10). Other models are fitted in the same way, using the point to surface distance as a likelihood measure. This fit is further refined by reprojection into the image, as described above.

In contrast to other systems the user does not need to specify parallel lines in the plane, its boundaries, or any other information. The previous application of the structure and motion process means that simply identifying the area in one of the images is sufficient.

As would be apparent to those skilled in the art, the creation of 3D models which reflect the shapes of objects represented in images is of interest both within Computer Vision and Computer Graphics. Computer Vision describes the field of research arising through the use of computers to analyse images. The filed of Computer Graphics is concerned with the use of computers to generate and display visual information.

The exemplary embodiments described herein allow a non-expert user to generate a 3D model on the basis of a image and a point cloud or more generally 3D information that is associated with the image. These 3D models have a large number of uses including but not limited to:

Reverse engineering: a large number of structures and objects exist for which there are no plans. This is a problem when modifications must be made, or a duplicate constructed. The lack of blueprints for a large number of buildings is a particular problem for those charged with their maintenance.

Insertion into virtual environments: a variety of forms of virtual environments exist, from computer games to simulation environments, but these environments are based on hand-modeled objects given the complexity and labor intensive nature of generating 3D models from real world objects. The ability to load your car into a driving game, or your favorite chair into Second Life™ would provide an extra level of realism to such a simulation environment.

3D printing: printers which generate 3D models are becoming much more affordable, but such 3D printing becomes much more appealing if it can reproduce real objects.

Auction sites: loading a 3D model of the object you wish to sell onto an auction site would provide potential purchasors with a much better feeling for what they might be buying.

Urban visualisation: 3D models of urban environments have a wide variety of applications, from urban planning to advertising.

Military and covert applications: The ability to generate accurate 3D models of complex shapes from imagery is a great advantage to both planning and simulation processes.

Policing: a number of forensic, planning and simulation applications exist that would benefit from being able to incorporate more realistic 3D models of actual objects.

Video editing: many sophisticated image-editing programs exist, but none that provide the same functionality for video. This is because simple operations, such as cutting and pasting objects between video sequences, require 3D models of both the object to be transferred and the environment into which they are to be inserted.

Those of skill in the art would further appreciate that the various illustrative method steps described in connection with the exemplary embodiments disclosed herein may be implemented as electronic hardware, computer software, or combinations of both. To clearly illustrate this interchangeability of hardware and software, the exemplary embodiments have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Figure 7:
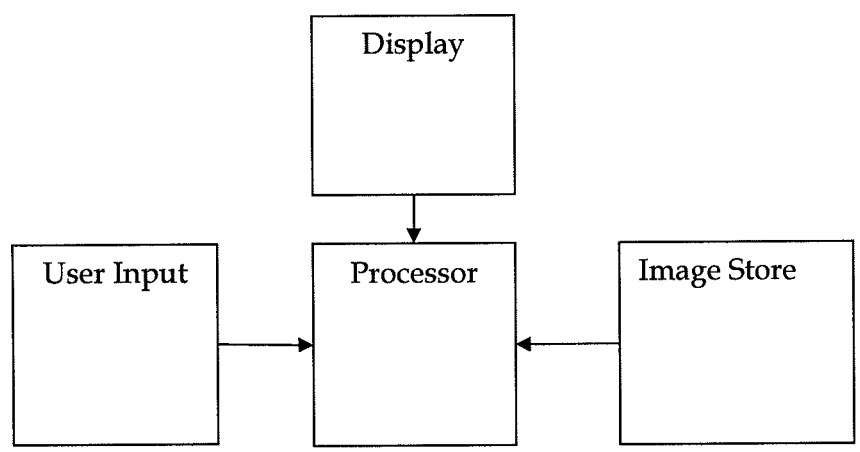
FIG. 7 is a system block diagram of a system embodying the present invention.
Figure 8:
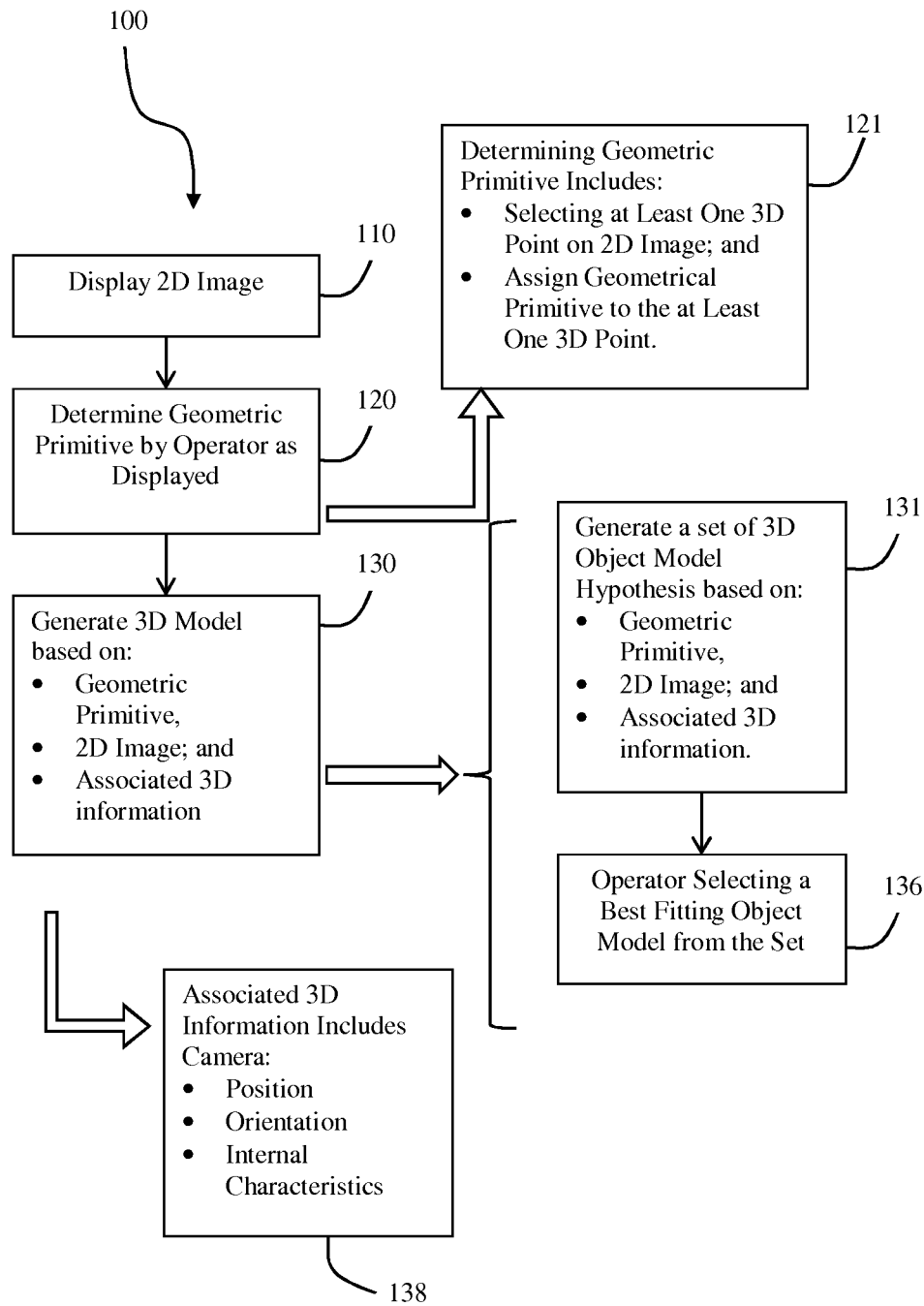
FIG. 8 is a flowchart of a method for generating a 3D model of an object depicted in a 2D image in accordance with the first exemplary embodiment of the present invention.
Figure 9:
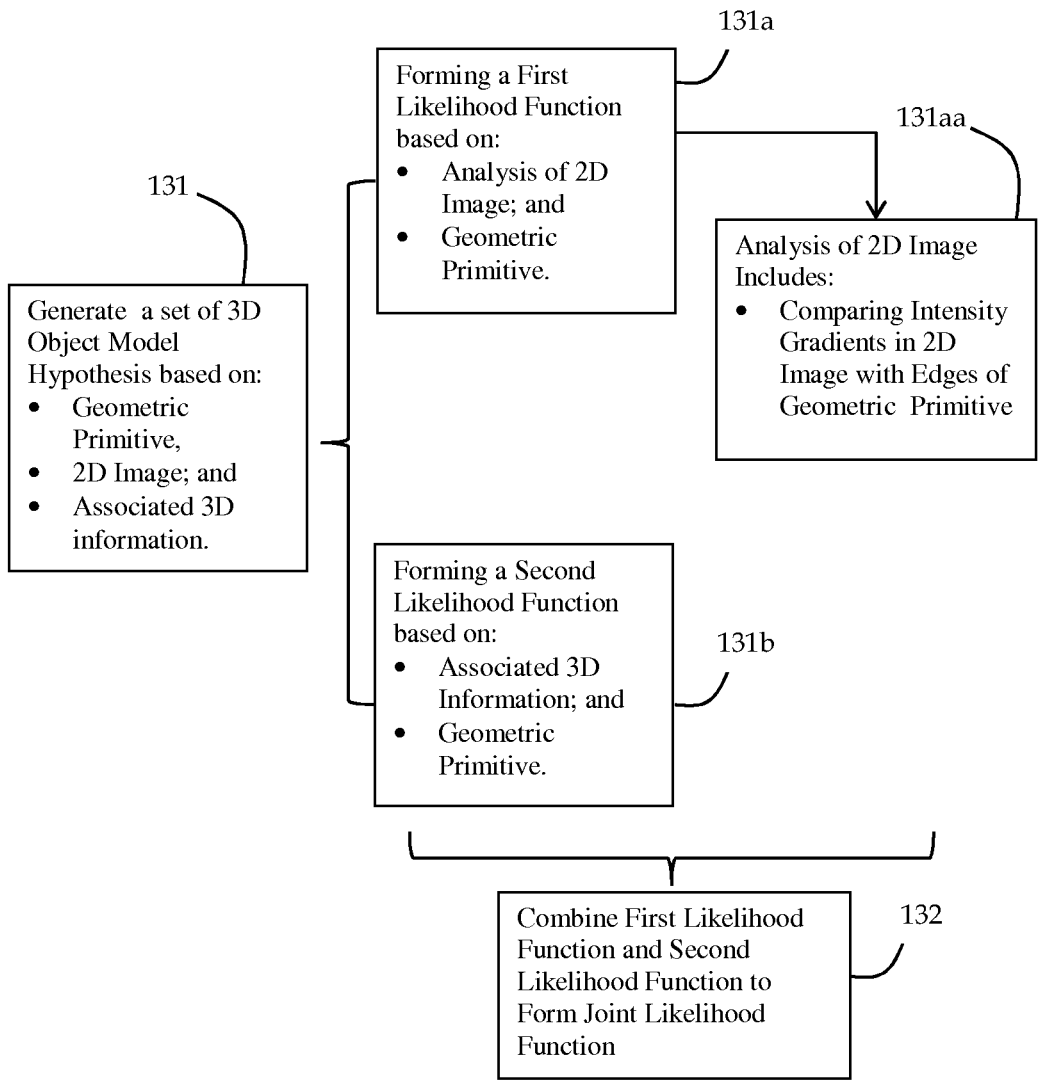
FIG. 9 is a flowchart depicting further method steps that may be incorporated into the method illustrated in FIG. 8.
Figure 10:
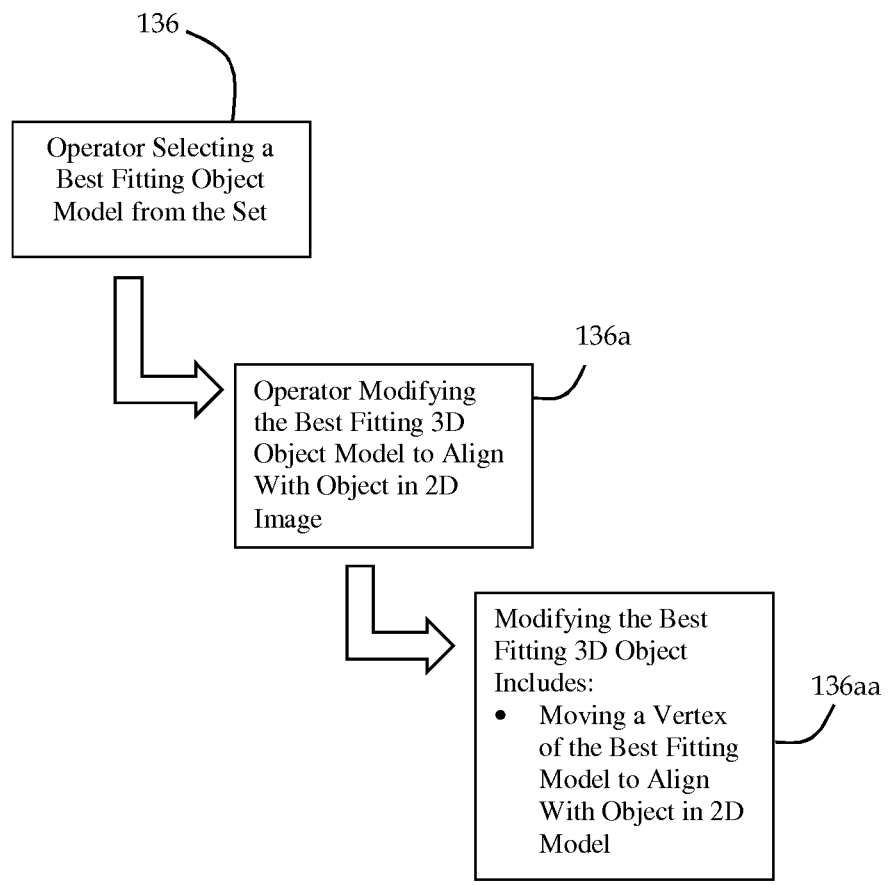
FIG. 10 is a flowchart depicting yet further method steps that may be incorporated into the methods illustrated in FIGS. 8 and 9.
Figure 11:
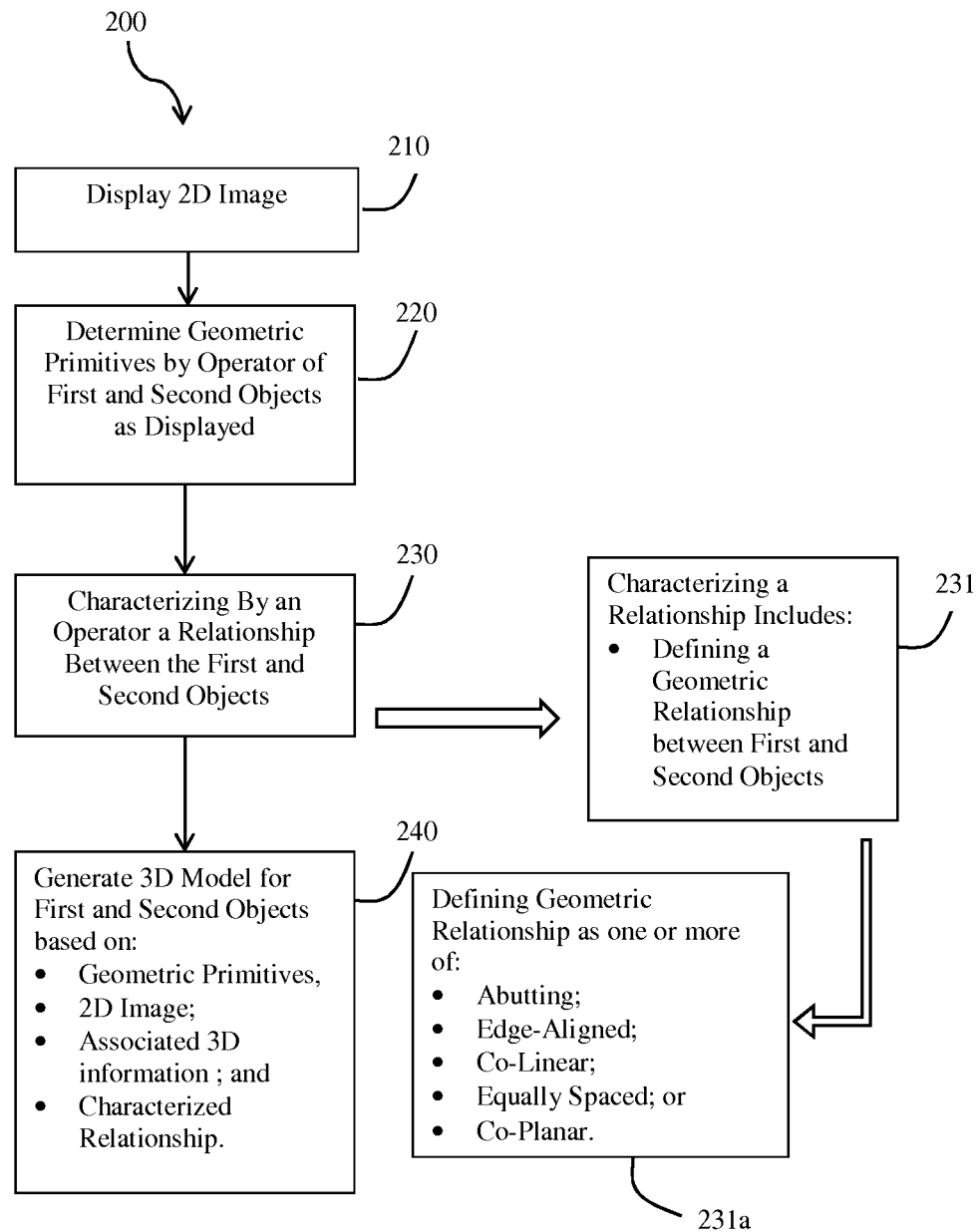
FIG. 11 is a flowchart of a method for generating a first 3D model and a second 3D model of corresponding first and second objects both depicted in a 3D image in accordance with the second exemplary embodiment of the present invention.
Figure 12:
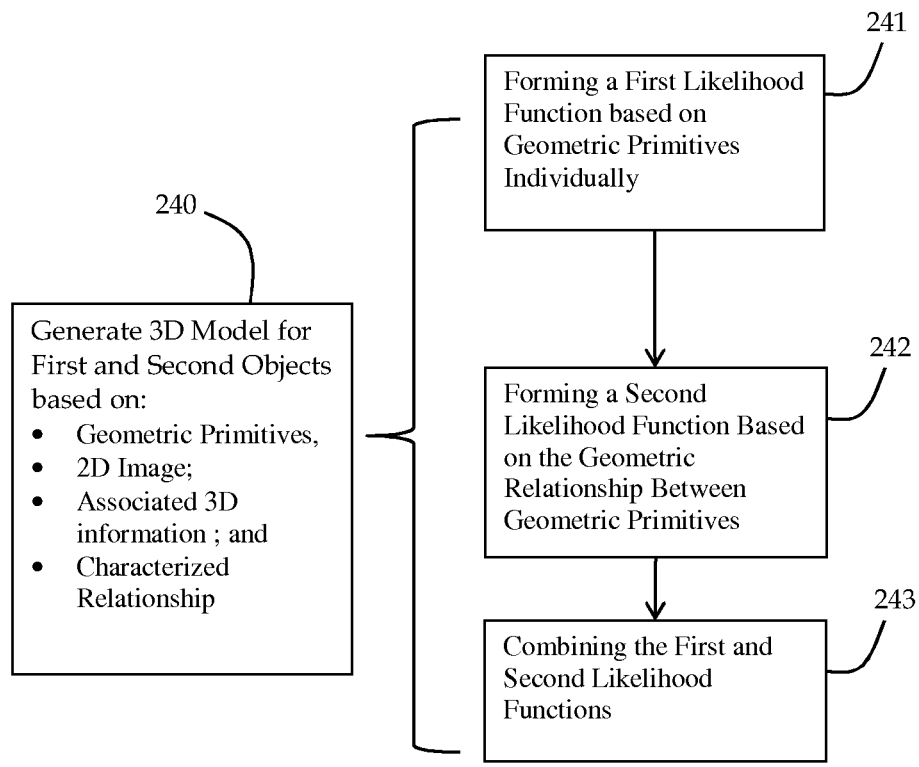
FIG. 12 is a flowchart depicting further method steps that may be incorporated into the method illustrated in FIG. 11.
Figure 13:
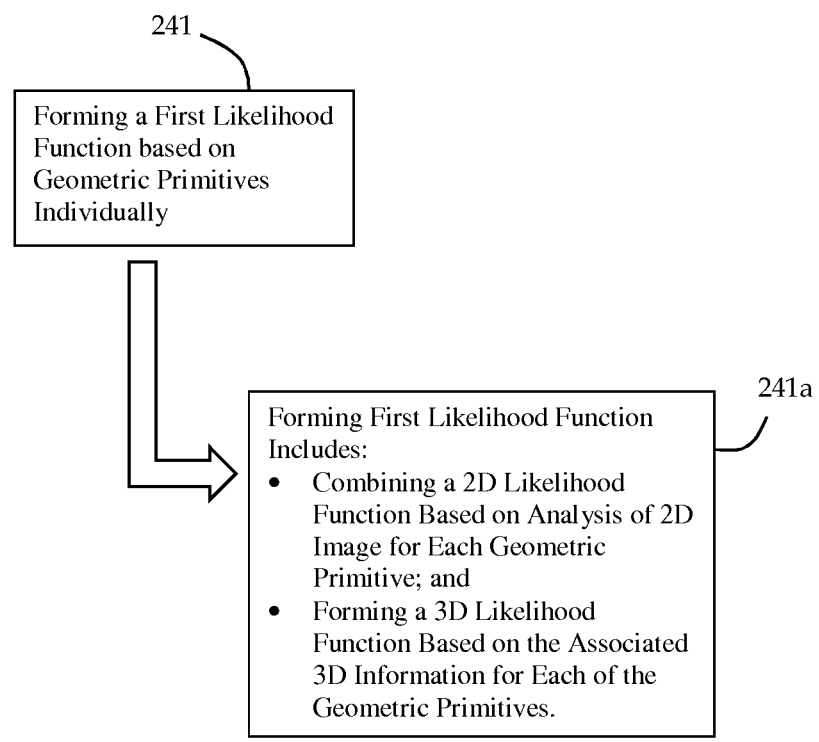
FIG. 13 is a flowchart depicting yet further method steps that may be incorporated into the methods illustrated in FIGS. 11 and 12.

In one form of the invention such as depicted in FIG. 7, there is provided a system including an image store for storing one or more images, a display for displaying the one or more images, user input such as a keyboard, mouse, joystick, trackball or equivalent for interactively receiving operator input and displaying on the display means indications of the operator input, a processor and a memory having stored thereon machine-executable instructions to be executed by the processor to perform one or more of the methods for generating a 3D model as described herein.

In another form of the invention, there is also provided a storage medium containing machine-readable instructions to perform one or more of the methods described herein. Examples of such a storage medium include a RAM memory, flash memory, ROM memory, EPROM memory, registers, hard disk, a removable disk, a CD-ROM, a DVD-ROM or any other form of computer readable medium.

The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A computer-implemented method for generating a first 3D model and a second 3D model of corresponding first and second objects both depicted in a 2D image, the 2D image having associated 3D information, the method comprising:

inputting the 2D image and the associated 3D information including 3D point location information corresponding to a physical location of at least one point located on a surface of the first and second objects;

displaying, on a display, the 2D image and the at least one point on the surface of the first and second objects in the 2D image, without displaying a geometric primitive;

determining, after inputting and displaying the at least one point on the surface of the first and second objects, geometric primitives that correspond to shape characteristics of the first and second objects displayed on the display, based on an input by an operator via a user input device, and indicating the determined geometric primitives via the user input device, the determined geometric primitives not sharing a location of the at least one point located on the surface of the first and second objects;

characterizing a relationship between the first and second objects, based on an input by the operator; and generating, by a processor, 3D models for the first and second objects based on the geometric primitives, the 2D image, the associated 3D information and the characterized relationship.

2. The computer-implemented method for generating a first 3D model and a second 3D model as claimed in claim 1, wherein the characterizing the relationship between the first and second objects includes defining a geometric relationship between the first and second objects, based on an input by the operator.

3. The computer-implemented method for generating a first 3D model and a second 3D model as claimed in claim 2, wherein the generating 3D models includes:

forming a first likelihood function for optimization based on the geometric primitives individually and a second likelihood function for optimization based on the geometric relationship between the geometric primitives; and combining the first and second likelihood functions.

4. The computer-implemented method for generating a first 3D model and a second 3D model as claimed in claim 3, wherein the forming a first likelihood function includes:

combining a 2D likelihood function based on an analysis of the 2D image for each of the geometric primitives; and forming a 3D likelihood function based on the associated 3D information for each of the geometric primitives.

5. The computer-implemented method for generating a first 3D model and a second 3D model as claimed in claim 2, wherein the defining the geometric relationship between the first and second objects includes defining the relationship as one or more of abutting, edge-aligned, co-linear, equally spaced or co-planar.

6. A system for generating a first 3D model and a second 3D model of corresponding first and second objects both depicted in a 2D image, the 2D image having associated 3D information, the system comprising:

an inputter that inputs the 2D image and the associated 3D information including 3D point location information corresponding to a physical location of at least one point located on a surface of the first and second objects;

an image display configured to display the 2D image and the at least one point on the surface of the first and second objects in the 2D image, without displaying a geometric primitive;

a user input device for an operator to select and display, on the image display, geometric primitives that correspond to shape characteristics of the first and second objects, and to characterize a relationship between the first and second objects, after the at least one point located on a surface of the first and second objects is input and displayed by the inputter and the image display, the geometric primitives not sharing a location of the at least one point located on the surface of the first and second objects; and a data processor configured to generate 3D models for the first and second objects based on the geometric primitives, the 2D image, the associated 3D information and the characterized relationship.

7. The system for generating a first 3D model and a second 3D model as claimed in claim 6, wherein the user input device characterizes the relationship between the first and second objects by defining a geometric relationship between the first and second objects, based on an input by the operator.

8. The system for generating a first 3D model and a second 3D model as claimed in claim 7, wherein the data processor generates the 3D models by:

forming a first likelihood function for optimization based on the geometric primitives individually and a second likelihood function for optimization based on the geometric relationship between the geometric primitives; and combining the first and second likelihood functions.

9. The system for generating a first 3D model and a second 3D model as claimed in claim 8, wherein the forming a first likelihood function includes:

combining a 2D likelihood function based on an analysis of the 2D image for each of the geometric primitives; and forming a 3D likelihood function based on the associated 3D information for each of the geometric primitives.

10. The system for generating a first 3D model and a second 3D model as claimed in claim 7, wherein the defining the geometric relationship between the first and second objects includes defining the relationship as one or more of abutting, edge-aligned, co-linear, equally spaced or co-planar.

* * * * *